May 1, 1928.
C. G. OLSON
1,667,865
LOCK WASHER
Filed Feb. 4, 1927
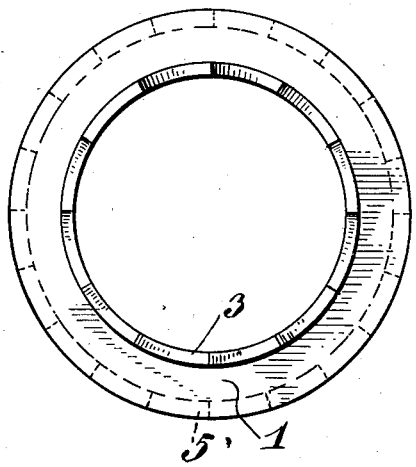
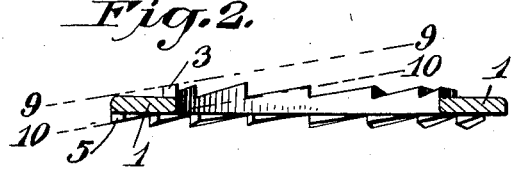
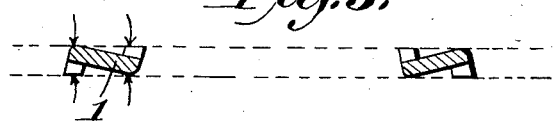
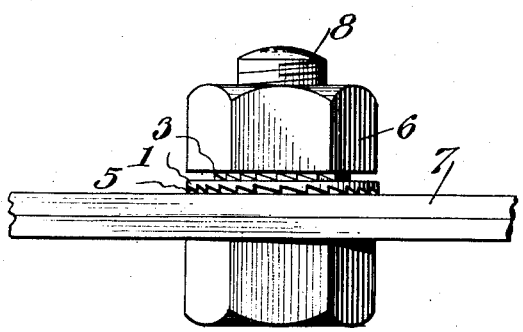
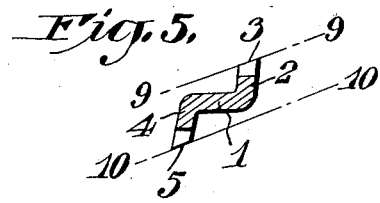
Inventor:
Carl G. Olson,
by George B. Willcox
Atty.

Patented May 1, 1928.

1,667,865

UNITED STATES PATENT OFFICE.

CARL G. OLSON, OF CHICAGO, ILLINOIS, ASSIGNOR TO SHAKEPROOF LOCK WASHER COMPANY, INCORPORATED, DIVISION OF ILLINOIS TOOL WORKS, OF CHICAGO, ILLINOIS, A CORPORATION OF ILLINOIS.

LOCK WASHER.

Application filed February 4, 1927. Serial No. 165,827.

This invention is an improvement in lock washers of the kind that automatically clutches the base or inner face of a nut or bolt head to the super-structure by the biting action of the teeth of the washer so as to prevent the nut or bolt head unscrewing under conditions of normal use.

The objects of my invention are to provide a washer construction that will admit of employing relatively light flexible spring material, yet capable of exerting an extraordinary powerful biting and locking effect.

Another object is to provide in a washer having oppositely directed rows of teeth a means by which the teeth are caused to bite into the work with an amount of pressure corresponding to the compressive force required to twist or bulge the main body or annular ring of the washer in a direction transverse to the axis of the bolt.

A still further object is to provide a washer having the above characteristics and which in addition is capable of causing the teeth to bite into the faces of the nut and substructure, first, by spring action and thereafter if sufficiently tighened, by direct endwise thrust of the teeth, as distinguished from washers in which the teeth engage the work solely by the springing action of the teeth themselves.

With the foregoing and certain other objects in view, which will appear later in the specifications, my invention comprises the devices described and claimed and the equivalents thereof.

In the drawings Fig. 1 is a plan view of a lock washer embodying my invention.

Figs. 2 and 3 are cross sectional views showing respectively the normal and the compressed positions of the annular ring and its rows of oppositely directed teeth.

Fig. 4 is a side view of the lock washer ready to be compressed to lock a nut to a substructure.

Fig. 5 is a sectional detail showing the ring with shallow teeth on the edge of a cylindrical flange of appreciable height.

As is clearly shown in the drawings, the lock washer comprises a flat annular ring 1 of spring material, such as steel or phosphor bronze. Around the inner periphery of the ring is a circular flange 2 having a series of teeth that project out from the plane of a face of the ring, substantially at right angles thereto, as shown in Fig. 2.

A second circular flange 4 extends around the outer periphery of the ring 1 and has a series of teeth 5. Each series of teeth is preferably regular as to its spacing, and the points of the teeth are preferably in a plane outside the planes of the two faces of the ring and parallel therewith.

In Fig. 2 a washer is shown in which the inner circular flange with its teeth 3 projects upward, and the outer flange with its teeth 4 projects downward.

When this washer is compressed between a nut 6 and the face of a piece of work or substructure 7 it bites into the surfaces with powerful, but yielding stress that is produced by the compressive flexing of the body of the annular ring, as shown in Fig. 3, which diagrammatically represents the washer of Fig. 2 in its compressed position. It will be seen that the flat ring 1, Fig. 2, becomes bodily warped or bulged along lines transverse to the axis of the bolt 8, and consequently a corresponding thrusting tendency is produced in the body of the washer, tending to bite the teeth 3 and 5 into the faces of the nut and substructure.

It is also evident that when the washer has been compressed into the position shown in Fig. 3 further tightening of the nut will exert very powerful driving effect endwise of the teeth to cause them to bite still harder. Under this condition the pressure is exerted lengthwise the teeth, as shown by the arrows in Fig. 3. Hence the teeth can be subjected to a very great compressive load without becoming distorted and without losing their gripping power. As soon as the nut tends to unscrew, the reactionary force in the flat annular ring, tending to restore it to its normal position, keeps the teeth powerfully engaged with the faces of the work and the substructure.

I prefer to make the cutting edges of the teeth inclined with respect to the axis of the bolt, as shown at 9, 9, 10, 10 in Fig. 2 instead of perpendicular to the bolt axis, in order that the cutting edges of the teeth may conform to the warped position of the ring 1 when compressed as shown in Fig. 3. Thus the complete flexing of the ring will produce line contact between the cutting edge of the tooth and the face of the work, and it is in the completely flexed position of the washer that the greatest holding power of the teeth is required.

By the means above described I have produced a simple and relatively inexpensive washer that can be made of comparatively thin spring material, yet capable of withstanding great pressure without injury to the teeth and adapted to exert an unusual degree of locking or biting force. It is obvious that the teeth 3 and 5 formed by serrating the concentric flanges 2 and 4 may be the full depth of the flange, as shown in Fig. 2, or if desired may be shallower so that a part of the circular body of the flange is left, as shown in Fig. 5.

Having thus described my invention, what I claim and desire to secure by Letters Patent is:

1. A lock washer comprising an annular ring of spring material, concentric circular flanges projecting from opposite faces of said ring, the flange from one face extending around the inner periphery of the ring, the flange from the opposite face around the outer periphery, each flange having a serrated edge forming a series of teeth and adapted when compressed to flex and warp the body of the ring, for the purposes set forth, the points of the teeth of each flange being in a plane outside the plane of the ring.

2. A lock washer comprising a flat annular ring of spring material, concentric circular flanges projecting from opposite faces of said ring at right angles thereto, one of said flanges extending around the inner periphery of the ring, the other around the outer periphery, each flange having a serrated edge forming a series of regular teeth, the points of which are in a plane outside the plane of the ring, but parallel therewith, said flanges in offset relation, whereby to produce warping of the body of the ring when the washer is compressed, for the purpose set forth.

3. A lock washer constructed as set forth in claim 1, the cutting edges of its teeth inclined to conform to the warped position of the ring when compressed.

4. A lock washer comprising a flat annular ring of spring material, a series of teeth around the inner periphery of one side only of said ring and projecting out from the plane of the ring at substantially right angles thereto, a second series of teeth around the outer periphery of the other side only of said ring and projecting out from its plane, said washer, when compressed between a nut and the face of a piece of work, adapted to warp, causing its teeth to bite into the engaging surfaces with powerful but yielding stress produced by the compressive warping of said annular ring.

In testimony whereof, I affix my signature.

CARL G. OLSON.